April 26, 1955  L. A. COX  2,707,012
LOCK WASHER
Filed Jan. 7, 1953
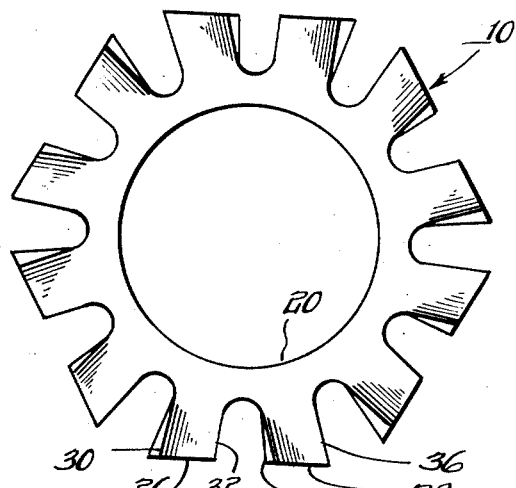
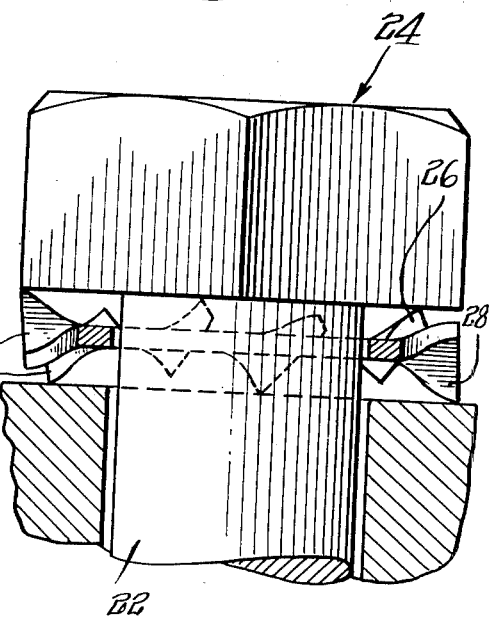
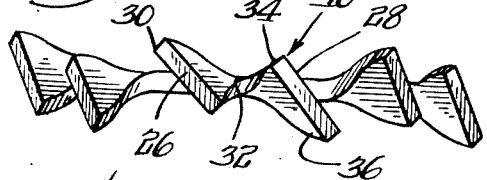
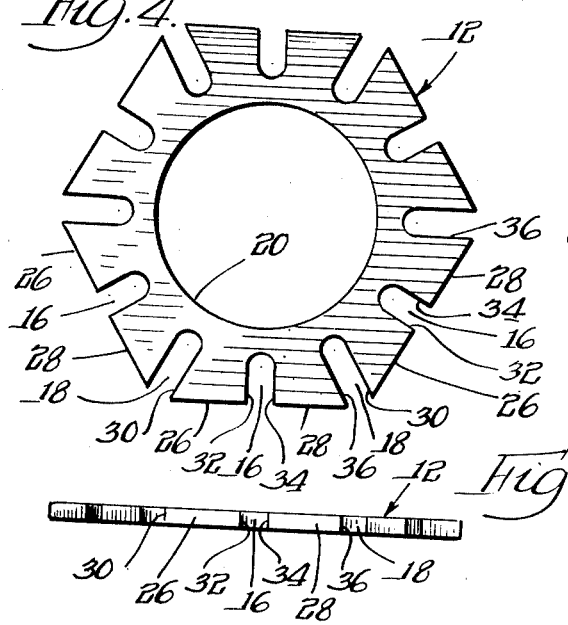
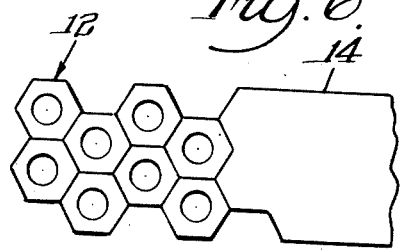
INVENTOR.
Linvell A. Cox
BY
Moore, Olson & Trexler
attys

United States Patent Office 2,707,012
Patented Apr. 26, 1955

2,707,012

LOCK WASHER

Linvell A. Cox, Chicago, Ill., assignor to Illinois Tool Works, Chicago, Ill., a corporation of Illinois Application January 7, 1953, Serial No. 330,057

5 Claims. (Cl. 151—35)

The present invention relates to a novel lock washer for use with rotary fastener elements such as nuts or screws, and more particularly to a novel lock washer of the twisted tooth type.

When using lock washers of the twisted tooth type heretofore known in the prior art, the engaging edges or corners of the teeth dig into the work piece or the fastener element, such as a nut or screw head, and cut grooves therein. In the prior art twisted tooth type lock washer, the engaging edges or corners of adjacent teeth tend to track in or follow the groove cut in the work piece or rotary fastener element by an adjacent tooth so that a relatively deep groove is formed, and the holding power of the washer is somewhat diminished. It is, therefore, an object of the present invention to provide a novel twisted tooth type lock washer of such construction that tracking is reduced and tracking between adjacent teeth is eliminated to eliminate injury to the work piece or rotary fastening member due to cutting a relatively deep groove therein and to provide increased holding power.

Another object of the present invention is to provide a novel twisted tooth type lock washer having the above characteristics, which novel lock washer may be quickly and easily manufactured with substantial savings in scrap.

Other objects and advantages of the present invention will appear from the following description and the accompanying drawings, wherein:

Fig. 1 is a plan view of a novel twisted tooth type lock washer embodying the principles of this invention;

Fig. 2 is a side elevational view of the lock washer of Fig. 1;

Fig. 3 illustrates an application of the lock washer of this invention;

Fig. 4 is a plan view of a blank from which the novel washer of this invention is formed;

Fig. 5 is a side elevational view of the blank of Fig. 4; and

Fig. 6 illustrates the manner in which the lock washer of this invention may be formed with a substantial saving in scrap material.

Referring now more specifically to the drawings, wherein like parts are designated by the same numerals throughout the various figures, a lock washer 10 shown best in Figs. 1 and 2 is preferably constructed from a blank 12, illustrated in Figs. 4 and 5. As shown best in Fig. 6, the blank 12 may be formed by a simple stamping process from a strip 14 of any suitable sheet material, and preferably sheet steel. It should be noted that the blank 12 is formed with a plurality of straight sides so that there is no waste scrap material left between the blanks, as would be the case in forming lock washers having generally circular peripheral shapes. The blanks 12 have been illustrated as having six sides, but it should be understood that the novel lock washers of this invention may be formed from blanks having other shapes.

Referring particularly to Fig. 4, it is seen that a plurality of slots 16 and 18 are formed about the periphery of the blank 12 with the slots 16 located substantially at the middle of each side of the blank and the slots 18 located at the corners between adjacent sides of the blank. A central aperture 20 is formed in the blank 12 for receiving the shank 22 of a screw 24, as shown in Fig. 3. This central aperture and the slots are preferably formed as the blank is stamped from the sheet metal strip 14. After the slots and central aperture have been formed, the blank 12 is in effect reduced to an annular body section having a plurality of finger-like tooth elements 26 and 28 projecting radially therefrom. The finger-like or tooth elements 26 have opposite edges 30 and 32, and the teeth 28 include opposite edges 34 and 36, which edges provide teeth for engaging a work piece or a rotary fastener element, such as the screw 24 in Fig. 3, after the finger-like or tooth elements 26 and 28 have been twisted, as described hereinbelow. It should be noted that the slots 16 and 18 are formed so that the outer corners of the edges 30 and 36 are positioned farther radially outwardly from the center of the blank 12 than the outer corners of the edges 32 and 34 of the tooth or finger-like elements. Thus, it is seen, adjacent edges of adjacent teeth are of substantially the same length, or, in other words, the shorter edges 32 and 34 are adjacent each other, and the longer edges 30 and 36 are adjacent each other.

The finger-like or tooth elements 26 and 28 are all twisted in the same direction, as shown best in Fig. 2. This positions the longer edge 30 of the teeth 26 axially outwardly from one side of the annular body section of the washer with the shorter edge 32 positioned axially outwardly of the opposite side of the washer. At the same time, this action positions the shorter side 34 of an adjacent finger-like or tooth element 28 axially outwardly in the same direction as the longer edge 30 of the finger-like element 26, while the longer edge 36 of the finger-like element 28 is positioned axially outwardly in the same direction as the shorter edge 32 of the adjacent tooth or finger-like element 26. It is thus seen that the longer edges and shorter edges of alternate tooth or finger-like elements are positioned on the same side of the annular body section of the washer. As shown best in Fig. 1, the tooth corners of adjacent finger-like elements on the same side of the annular body section of the washer are disposed different distances from the center of the washer so that as the head of the screw 24 is turned relative to the washer, or as the washer is turned relative to the work, the tooth corner of one of the finger-like elements does not track in the groove of the tooth corner of the immediately preceding finger-like or tooth element. This arrangement materially reduces cutting and injury of the work piece or rotary fastener element and increases the holding power of the washer. In addition, it should be noted that because of the particular construction of the finger-like or tooth elements, the corners of the longer edges 30 and 36 are disposed in planes axially outwardly of the planes of the corners of the shorter edges 34 and 32, respectively. By this structure, only the corners of the relatively long edges initially engage the work piece or the rotary fastener to permit relatively easy turning of the fastener, such as the screw 24 or a suitable nut, not shown, until such time as the finger-like or tooth elements become deflected sufficiently to permit the engagement of the shorter edges 32 and 34.

From the above description, it is seen that the present invention has provided a novel lock washer of the twisted tooth type, wherein increased holding power is provided and the possibility of injury to the work piece or fastener element is reduced by eliminating tracking of the immediately adjacent teeth. Furthermore, it is seen that by reason of the novel formation of the lock washer of this invention, considerable savings in scrap material may be effected.

While the preferred embodiment of the present invention has been shown and described herein, it is obvious that changes may be made in the details of the novel lock and washer without departing from the spirit and scope of the appended claims.

I claim:

1. A lock washer, comprising an annular sheet material body section, a plurality of tooth elements extending radially from a marginal portion of said body section, each of said tooth elements having one generally radially projecting edge longer than and extending from said body section radially beyond another generally radially projecting edge, adjacent generally radially projecting edges of adjacent tooth elements having the same relationship to the other generally radially projecting edge of their respective tooth elements, and said tooth elements being twisted about their radial axes to position the longer edges of adjacent tooth elements axially of opposite sides of the body section and to position the shorter edges of adjacent tooth elements axially of opposite sides of the body section.

2. A lock washer, comprising a sheet material body section having a central aperture therethrough, one of the marginal edges of said body section having a substantially regular polygonal shape with a plurality of substantially straight sides merging at a plurality of corners, said body section having a plurality of generally radially extending recesses in said marginal edge and interrupting mid portions of each of said sides and interrupting each of said corners to provide a plurality of tooth elements, each of said tooth elements having a pair of generally radially extending edges with one of said edges being longer than and extending from the body section radially beyond the other, and said tooth elements being twisted about their radial axes to position the longer edges of adjacent tooth elements axially of opposite sides of the body section and to position the shorter edges of adjacent tooth elements axially of opposite sides of the body section.

3. A lock washer as defined in claim 1 wherein the longer and shorter edges positioned axially of the same side of the body section are disposed in planes axially spaced from each other.

4. A lock washer as defined in claim 2 wherein the longer and shorter edges positioned axially of the same side of the body section are disposed in planes axially spaced from each other.

5. A lock washer, comprising an annular sheet material body section, a plurality of tooth elements extending radially from a marginal portion of said body section, each of said tooth elements having one generally radially projecting edge extending to a circle concentric with said body section and another generally radially projecting edge extending to another circle concentric with said body section and having a diameter less than the diameter of said first mentioned circle, adjacent generally radially projecting edges of adjacent tooth elements having the same radial extent relationship to the other generally radially projecting edge of their respective tooth elements, and said tooth elements being twisted about their radial axis to position said first mentioned edges of adjacent tooth elements axially of opposite sides of the body section and to position said second mentioned edges of adjacent tooth elements axially of opposite sides of the body section.

References Cited in the file of this patent

UNITED STATES PATENTS

| 798,101 | Hoffmann | Aug. 29, 1905 |
| 1,846,271 | Olson | Feb. 23, 1932 |
| 1,878,199 | Stenger | Sept. 20, 1932 |

FOREIGN PATENTS

| 469,369 | Great Britain | July 23, 1937 |
| 204,565 | Switzerland | Oct. 16, 1939 |